US008949120B1

(12) United States Patent
Every et al.

(10) Patent No.: US 8,949,120 B1
(45) Date of Patent: Feb. 3, 2015

(54) ADAPTIVE NOISE CANCELATION

(75) Inventors: Mark Every, Palo Alto, CA (US); Ludger Solbach, Mountain View, CA (US); Carlo Murgia, Sunnyvale, CA (US); Ye Jiang, Sunnyvale, CA (US)

(73) Assignee: Audience, Inc., Mountain View, CA (US)

( * ) Notice: Subject to any disclaimer, the term of this patent is extended or adjusted under 35 U.S.C. 154(b) by 771 days.

(21) Appl. No.: 12/422,917

(22) Filed: Apr. 13, 2009

(51) Int. Cl.

| | |
|---|---|
| ***G10L 21/00*** | (2013.01) |
| ***G10L 15/00*** | (2013.01) |
| ***G10K 11/16*** | (2006.01) |
| ***H04B 15/00*** | (2006.01) |
| ***G10L 21/0208*** | (2013.01) |
| ***G10L 21/0316*** | (2013.01) |
| ***G10L 21/02*** | (2013.01) |

(52) U.S. Cl.
CPC ......... *G10L 21/0208* (2013.01); *G10L 21/0316* (2013.01); *G10L 21/02* (2013.01)
USPC ........... 704/226; 704/227; 704/231; 704/233; 704/200; 381/71.1; 381/71.2; 381/71.6; 381/71.8; 381/71.11; 381/71.12; 381/71.13; 381/71.14; 381/94.1; 381/94.2; 381/94.3; 381/94.5; 381/94.7

(58) Field of Classification Search
CPC ..... G10L 15/20; G10L 21/02; G10L 21/0202; G10L 21/0205; G10L 21/0208; G10L 21/02016; G10L 21/0316; G10L 2021/0208; G10L 2021/0216; G10L 2021/0364; G10K 11/178; G10K 11/1783; G10K 11/1782; G10K 11/1786; G10K 11/1788; G10K 2011/00; G10K 2011/10; G10K 2011/30; G10K 2011/3012; G10K 2011/3014; G10K 2011/3016; G10K 2011/3023; G10K 2011/3026; G10K 2011/3028; G10K 2011/3035; G10K 2011/3041; G10K 2011/3045; G10K 2011/3055
USPC ......................... 704/226–227, 233, 231, 200; 381/71.1–71.14; 379/387.01–392.01; 455/570
See application file for complete search history.

(56) References Cited

U.S. PATENT DOCUMENTS

| | | | |
|---|---|---|---|
| 3,976,863 | A | 8/1976 | Engel |
| 3,978,287 | A | 8/1976 | Fletcher et al. |
| 4,137,510 | A | 1/1979 | Iwahara |
| 4,433,604 | A | 2/1984 | Ott |

(Continued)

FOREIGN PATENT DOCUMENTS

| | | |
|---|---|---|
| JP | 62110349 | 5/1987 |
| JP | 4184400 | 7/1992 |

(Continued)

OTHER PUBLICATIONS

International Search Report dated May 29, 2003 in Application No. PCT/US03/04124.

(Continued)

*Primary Examiner* — Paras D Shah
(74) *Attorney, Agent, or Firm* — Carr & Ferrell LLP

(57) ABSTRACT

Systems and methods for controlling adaptivity of noise cancellation are presented. One or more audio signals are received by one or more corresponding microphones. The one or more signals may be decomposed into frequency sub-bands. Noise cancellation consistent with identified adaptation constraints is performed on the one or more audio signals. The one or more audio signals may then be reconstructed from the frequency sub-bands and outputted via an output device.

18 Claims, 7 Drawing Sheets

(56) References Cited

U.S. PATENT DOCUMENTS

| | | | | |
|---|---|---|---|---|
| 4,516,259 | A | 5/1985 | Yato et al. | |
| 4,536,844 | A | 8/1985 | Lyon | |
| 4,581,758 | A | 4/1986 | Coker et al. | |
| 4,628,529 | A | 12/1986 | Borth et al. | |
| 4,630,304 | A | 12/1986 | Borth et al. | |
| 4,649,505 | A | 3/1987 | Zinser, Jr. et al. | |
| 4,658,426 | A | 4/1987 | Chabries et al. | |
| 4,674,125 | A | 6/1987 | Carlson et al. | |
| 4,718,104 | A | 1/1988 | Anderson | |
| 4,811,404 | A | 3/1989 | Vilmur et al. | |
| 4,812,996 | A | 3/1989 | Stubbs | |
| 4,864,620 | A | 9/1989 | Bialick | |
| 4,920,508 | A | 4/1990 | Yassaie et al. | |
| 4,991,166 | A * | 2/1991 | Julstrom | 370/288 |
| 5,027,410 | A | 6/1991 | Williamson et al. | |
| 5,054,085 | A | 10/1991 | Meisel et al. | |
| 5,058,419 | A | 10/1991 | Nordstrom et al. | |
| 5,099,738 | A | 3/1992 | Hotz | |
| 5,119,711 | A | 6/1992 | Bell et al. | |
| 5,142,961 | A | 9/1992 | Paroutaud | |
| 5,150,413 | A | 9/1992 | Nakatani et al. | |
| 5,175,769 | A | 12/1992 | Hejna, Jr. et al. | |
| 5,187,776 | A | 2/1993 | Yanker | |
| 5,208,864 | A | 5/1993 | Kaneda | |
| 5,210,366 | A | 5/1993 | Sykes, Jr. | |
| 5,230,022 | A | 7/1993 | Sakata | |
| 5,319,736 | A | 6/1994 | Hunt | |
| 5,323,459 | A * | 6/1994 | Hirano | 379/391 |
| 5,341,432 | A | 8/1994 | Suzuki et al. | |
| 5,381,473 | A | 1/1995 | Andrea et al. | |
| 5,381,512 | A | 1/1995 | Holton et al. | |
| 5,400,409 | A | 3/1995 | Linhard | |
| 5,402,493 | A | 3/1995 | Goldstein | |
| 5,402,496 | A | 3/1995 | Soli et al. | |
| 5,471,195 | A | 11/1995 | Rickman | |
| 5,473,702 | A | 12/1995 | Yoshida et al. | |
| 5,473,759 | A | 12/1995 | Slaney et al. | |
| 5,479,564 | A | 12/1995 | Vogten et al. | |
| 5,502,663 | A | 3/1996 | Lyon | |
| 5,544,250 | A * | 8/1996 | Urbanski | 381/94.3 |
| 5,574,824 | A | 11/1996 | Slyh et al. | |
| 5,583,784 | A | 12/1996 | Kapust et al. | |
| 5,587,998 | A | 12/1996 | Velardo, Jr. et al. | |
| 5,590,241 | A | 12/1996 | Park et al. | |
| 5,602,962 | A | 2/1997 | Kellermann | |
| 5,675,778 | A | 10/1997 | Jones | |
| 5,682,463 | A | 10/1997 | Allen et al. | |
| 5,694,474 | A | 12/1997 | Ngo et al. | |
| 5,706,395 | A | 1/1998 | Arslan et al. | |
| 5,717,829 | A | 2/1998 | Takagi | |
| 5,729,612 | A | 3/1998 | Abel et al. | |
| 5,732,189 | A | 3/1998 | Johnston et al. | |
| 5,749,064 | A | 5/1998 | Pawate et al. | |
| 5,757,937 | A | 5/1998 | Itoh et al. | |
| 5,792,971 | A | 8/1998 | Timis et al. | |
| 5,796,819 | A * | 8/1998 | Romesburg | 379/406.09 |
| 5,806,025 | A | 9/1998 | Vis et al. | |
| 5,809,463 | A * | 9/1998 | Gupta et al. | 704/233 |
| 5,825,320 | A | 10/1998 | Miyamori et al. | |
| 5,839,101 | A | 11/1998 | Vahatalo et al. | |
| 5,920,840 | A | 7/1999 | Satyamurti et al. | |
| 5,933,495 | A * | 8/1999 | Oh | 379/406.08 |
| 5,943,429 | A | 8/1999 | Handel | |
| 5,956,674 | A | 9/1999 | Smyth et al. | |
| 5,974,380 | A | 10/1999 | Smyth et al. | |
| 5,978,824 | A | 11/1999 | Ikeda | |
| 5,983,139 | A | 11/1999 | Zierhofer | |
| 5,990,405 | A | 11/1999 | Auten et al. | |
| 6,002,776 | A | 12/1999 | Bhadkamkar et al. | |
| 6,061,456 | A | 5/2000 | Andrea et al. | |
| 6,072,881 | A | 6/2000 | Linder | |
| 6,097,820 | A | 8/2000 | Turner | |
| 6,108,626 | A | 8/2000 | Cellario et al. | |
| 6,122,610 | A | 9/2000 | Isabelle | |
| 6,134,524 | A | 10/2000 | Peters et al. | |
| 6,137,349 | A | 10/2000 | Menkhoff et al. | |
| 6,140,809 | A | 10/2000 | Doi | |
| 6,173,255 | B1 | 1/2001 | Wilson et al. | |
| 6,180,273 | B1 | 1/2001 | Okamoto | |
| 6,216,103 | B1 | 4/2001 | Wu et al. | |
| 6,222,927 | B1 | 4/2001 | Feng et al. | |
| 6,223,090 | B1 | 4/2001 | Brungart | |
| 6,226,616 | B1 | 5/2001 | You et al. | |
| 6,263,307 | B1 | 7/2001 | Arslan et al. | |
| 6,266,633 | B1 | 7/2001 | Higgins et al. | |
| 6,317,501 | B1 | 11/2001 | Matsuo | |
| 6,339,758 | B1 | 1/2002 | Kanazawa et al. | |
| 6,355,869 | B1 | 3/2002 | Mitton | |
| 6,363,345 | B1 | 3/2002 | Marash et al. | |
| 6,381,570 | B2 * | 4/2002 | Li et al. | 704/233 |
| 6,430,295 | B1 | 8/2002 | Handel et al. | |
| 6,434,417 | B1 | 8/2002 | Lovett | |
| 6,449,586 | B1 | 9/2002 | Hoshuyama | |
| 6,469,732 | B1 | 10/2002 | Chang et al. | |
| 6,487,257 | B1 | 11/2002 | Gustafsson et al. | |
| 6,496,795 | B1 | 12/2002 | Malvar | |
| 6,513,004 | B1 | 1/2003 | Rigazio et al. | |
| 6,516,066 | B2 | 2/2003 | Hayashi | |
| 6,529,606 | B1 * | 3/2003 | Jackson et al. | 381/71.4 |
| 6,549,630 | B1 | 4/2003 | Bobisuthi | |
| 6,584,203 | B2 | 6/2003 | Elko et al. | |
| 6,622,030 | B1 | 9/2003 | Romesburg et al. | |
| 6,717,991 | B1 | 4/2004 | Gustafsson et al. | |
| 6,718,309 | B1 | 4/2004 | Selly | |
| 6,738,482 | B1 | 5/2004 | Jaber | |
| 6,760,450 | B2 | 7/2004 | Matsuo | |
| 6,785,381 | B2 | 8/2004 | Gartner et al. | |
| 6,792,118 | B2 | 9/2004 | Watts | |
| 6,795,558 | B2 | 9/2004 | Matsuo | |
| 6,798,886 | B1 | 9/2004 | Smith et al. | |
| 6,810,273 | B1 | 10/2004 | Mattila et al. | |
| 6,882,736 | B2 | 4/2005 | Dickel et al. | |
| 6,915,257 | B2 * | 7/2005 | Heikkinen et al. | 704/214 |
| 6,915,264 | B2 | 7/2005 | Baumgarte | |
| 6,917,688 | B2 | 7/2005 | Yu et al. | |
| 6,944,510 | B1 | 9/2005 | Ballesty et al. | |
| 6,978,159 | B2 | 12/2005 | Feng et al. | |
| 6,982,377 | B2 | 1/2006 | Sakurai et al. | |
| 6,999,582 | B1 | 2/2006 | Popovic et al. | |
| 7,016,507 | B1 | 3/2006 | Brennan | |
| 7,020,605 | B2 | 3/2006 | Gao | |
| 7,031,478 | B2 | 4/2006 | Belt et al. | |
| 7,054,452 | B2 | 5/2006 | Ukita | |
| 7,065,485 | B1 | 6/2006 | Chong-White et al. | |
| 7,076,315 | B1 | 7/2006 | Watts | |
| 7,092,529 | B2 | 8/2006 | Yu et al. | |
| 7,092,882 | B2 | 8/2006 | Arrowood et al. | |
| 7,099,821 | B2 | 8/2006 | Visser et al. | |
| 7,142,677 | B2 | 11/2006 | Gonopolskiy et al. | |
| 7,146,316 | B2 | 12/2006 | Alves | |
| 7,155,019 | B2 | 12/2006 | Hou | |
| 7,164,620 | B2 | 1/2007 | Hoshuyama | |
| 7,171,008 | B2 | 1/2007 | Elko | |
| 7,171,246 | B2 | 1/2007 | Mattila et al. | |
| 7,174,022 | B1 | 2/2007 | Zhang et al. | |
| 7,206,418 | B2 | 4/2007 | Yang et al. | |
| 7,209,567 | B1 | 4/2007 | Kozel et al. | |
| 7,225,001 | B1 | 5/2007 | Eriksson et al. | |
| 7,242,762 | B2 * | 7/2007 | He et al. | 379/406.08 |
| 7,246,058 | B2 | 7/2007 | Burnett | |
| 7,254,242 | B2 | 8/2007 | Ise et al. | |
| 7,359,520 | B2 | 4/2008 | Brennan et al. | |
| 7,412,379 | B2 | 8/2008 | Taori et al. | |
| 7,912,567 | B2 * | 3/2011 | Chhatwal et al. | 700/94 |
| 8,098,812 | B2 * | 1/2012 | Fadili et al. | 379/390.02 |
| 8,103,011 | B2 * | 1/2012 | Mohammad et al. | 381/66 |
| 2001/0016020 | A1 | 8/2001 | Gustafsson et al. | |
| 2001/0031053 | A1 | 10/2001 | Feng et al. | |
| 2002/0002455 | A1 | 1/2002 | Accardi et al. | |
| 2002/0009203 | A1 | 1/2002 | Erten | |
| 2002/0041693 | A1 | 4/2002 | Matsuo | |
| 2002/0080980 | A1 | 6/2002 | Matsuo | |
| 2002/0106092 | A1 | 8/2002 | Matsuo | |
| 2002/0116187 | A1 | 8/2002 | Erten | |

(56) References Cited

U.S. PATENT DOCUMENTS

| | | | | |
|---|---|---|---|---|
| 2002/0133334 | A1 | 9/2002 | Coorman et al. | |
| 2002/0147595 | A1 | 10/2002 | Baumgarte | |
| 2002/0184013 | A1 | 12/2002 | Walker | |
| 2003/0014248 | A1 | 1/2003 | Vetter | |
| 2003/0026437 | A1 | 2/2003 | Janse et al. | |
| 2003/0033140 | A1 | 2/2003 | Taori et al. | |
| 2003/0039369 | A1 | 2/2003 | Bullen | |
| 2003/0040908 | A1 | 2/2003 | Yang et al. | |
| 2003/0061032 | A1 | 3/2003 | Gonopolskiy | |
| 2003/0063759 | A1 | 4/2003 | Brennan et al. | |
| 2003/0072382 | A1 | 4/2003 | Raleigh et al. | |
| 2003/0072460 | A1 | 4/2003 | Gonopolskiy et al. | |
| 2003/0095667 | A1 | 5/2003 | Watts | |
| 2003/0099345 | A1 | 5/2003 | Gartner et al. | |
| 2003/0101048 | A1 | 5/2003 | Liu | |
| 2003/0103632 | A1 | 6/2003 | Goubran et al. | |
| 2003/0128851 | A1 | 7/2003 | Furuta | |
| 2003/0138116 | A1 | 7/2003 | Jones et al. | |
| 2003/0147538 | A1 | 8/2003 | Elko | |
| 2003/0169891 | A1 | 9/2003 | Ryan et al. | |
| 2003/0228023 | A1* | 12/2003 | Burnett et al. | 381/92 |
| 2004/0013276 | A1 | 1/2004 | Ellis et al. | |
| 2004/0015348 | A1* | 1/2004 | McArthur et al. | 704/226 |
| 2004/0047464 | A1* | 3/2004 | Yu et al. | 379/392.01 |
| 2004/0057574 | A1 | 3/2004 | Faller | |
| 2004/0078199 | A1 | 4/2004 | Kremer et al. | |
| 2004/0131178 | A1 | 7/2004 | Shahaf et al. | |
| 2004/0133421 | A1 | 7/2004 | Burnett et al. | |
| 2004/0165736 | A1 | 8/2004 | Hetherington et al. | |
| 2004/0196989 | A1 | 10/2004 | Friedman et al. | |
| 2004/0263636 | A1 | 12/2004 | Cutler et al. | |
| 2005/0025263 | A1 | 2/2005 | Wu | |
| 2005/0027520 | A1 | 2/2005 | Mattila et al. | |
| 2005/0049864 | A1 | 3/2005 | Kaltenmeier et al. | |
| 2005/0060142 | A1 | 3/2005 | Visser et al. | |
| 2005/0152559 | A1 | 7/2005 | Gierl et al. | |
| 2005/0185813 | A1 | 8/2005 | Sinclair et al. | |
| 2005/0213778 | A1 | 9/2005 | Buck et al. | |
| 2005/0216259 | A1 | 9/2005 | Watts | |
| 2005/0228518 | A1 | 10/2005 | Watts | |
| 2005/0276423 | A1 | 12/2005 | Aubauer et al. | |
| 2005/0288923 | A1 | 12/2005 | Kok | |
| 2006/0072768 | A1 | 4/2006 | Schwartz et al. | |
| 2006/0074646 | A1 | 4/2006 | Alves et al. | |
| 2006/0098809 | A1* | 5/2006 | Nongpiur et al. | 379/406.14 |
| 2006/0120537 | A1 | 6/2006 | Burnett et al. | |
| 2006/0133621 | A1 | 6/2006 | Chen et al. | |
| 2006/0149535 | A1 | 7/2006 | Choi et al. | |
| 2006/0160581 | A1* | 7/2006 | Beaugeant et al. | 455/570 |
| 2006/0184363 | A1 | 8/2006 | McCree et al. | |
| 2006/0198542 | A1 | 9/2006 | Benjelloun Touimi et al. | |
| 2006/0222184 | A1 | 10/2006 | Buck et al. | |
| 2007/0021958 | A1 | 1/2007 | Visser et al. | |
| 2007/0027685 | A1 | 2/2007 | Arakawa et al. | |
| 2007/0033020 | A1 | 2/2007 | (Kelleher) Francois et al. | |
| 2007/0067166 | A1 | 3/2007 | Pan et al. | |
| 2007/0078649 | A1 | 4/2007 | Hetherington et al. | |
| 2007/0094031 | A1 | 4/2007 | Chen | |
| 2007/0100612 | A1 | 5/2007 | Ekstrand et al. | |
| 2007/0116300 | A1 | 5/2007 | Chen | |
| 2007/0150268 | A1 | 6/2007 | Acero et al. | |
| 2007/0154031 | A1 | 7/2007 | Avendano et al. | |
| 2007/0165879 | A1 | 7/2007 | Deng et al. | |
| 2007/0195968 | A1 | 8/2007 | Jaber | |
| 2007/0230712 | A1 | 10/2007 | Belt et al. | |
| 2007/0276656 | A1 | 11/2007 | Solbach et al. | |
| 2008/0019548 | A1 | 1/2008 | Avendano | |
| 2008/0033723 | A1 | 2/2008 | Jang et al. | |
| 2008/0140391 | A1 | 6/2008 | Yen et al. | |
| 2008/0201138 | A1* | 8/2008 | Visser et al. | 704/227 |
| 2008/0228478 | A1* | 9/2008 | Hetherington et al. | 704/233 |
| 2008/0260175 | A1 | 10/2008 | Elko | |
| 2009/0012783 | A1 | 1/2009 | Klein | |
| 2009/0012786 | A1* | 1/2009 | Zhang et al. | 704/233 |
| 2009/0129610 | A1* | 5/2009 | Kim et al. | 381/94.7 |
| 2009/0220107 | A1 | 9/2009 | Every et al. | |
| 2009/0238373 | A1 | 9/2009 | Klein | |
| 2009/0253418 | A1 | 10/2009 | Makinen | |
| 2009/0271187 | A1* | 10/2009 | Yen et al. | 704/226 |
| 2009/0323982 | A1 | 12/2009 | Solbach et al. | |
| 2010/0094643 | A1 | 4/2010 | Avendano et al. | |
| 2010/0278352 | A1 | 11/2010 | Petit et al. | |
| 2011/0178800 | A1 | 7/2011 | Watts | |

FOREIGN PATENT DOCUMENTS

| | | |
|---|---|---|
| JP | 5053587 | 3/1993 |
| JP | 6269083 | 9/1994 |
| JP | 10-313497 | 11/1998 |
| JP | 11-249693 | 9/1999 |
| JP | 2005110127 | 4/2005 |
| JP | 2005195955 | 7/2005 |
| WO | 01/74118 | 10/2001 |
| WO | 03/043374 | 5/2003 |
| WO | 03/069499 | 8/2003 |
| WO | 2007/081916 | 7/2007 |
| WO | 2007/140003 | 12/2007 |
| WO | 2010/005493 | 1/2010 |

OTHER PUBLICATIONS

International Search Report and Written Opinion dated Oct. 19, 2007 in Application No. PCT/US07/00463.

International Search Report and Written Opinion dated Apr. 9, 2008 in Application No. PCT/US07/21654.

International Search Report and Written Opinion dated Sep. 16, 2008 in Application No. PCT/US07/12628.

International Search Report and Written Opinion dated Oct. 1, 2008 in Application No. PCT/US08/08249.

International Search Report and Written Opinion dated May 11, 2009 in Application No. PCT/US09/01667.

International Search Report and Written Opinion dated Aug. 27, 2009 in Application No. PCT/US09/03813.

International Search Report and Written Opinion dated May 20, 2010 in Application No. PCT/US09/06754.

Fast Cochlea Transform, US Trademark Reg. No. 2,875,755 (Aug. 17, 2004).

Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.

Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.

Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.

Moulines, Eric et al., "Non-Parametric Techniques for Pitch-Scale and Time-Scale Modification of Speech", Speech Communication, vol. 16, pp. 175-205, 1995.

Verhelst, Werner, "Overlap-Add Methods for Time-Scaling of Speech", Speech Communication vol. 30, pp. 207-221, 2000.

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

(56) References Cited

OTHER PUBLICATIONS

Boll, Steven F. et al. "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.
Boll, Steven F. "Suppression of Acoustic Noise in Speech Using Spectral Subtraction", Dept. of Computer Science, University of Utah Salt Lake City, Utah, Apr. 1979, pp. 18-19.
Chen, Jingdong et al. "New Insights into the Noise Reduction Wiener Filter", IEEE Transactions on Audio, Speech, and Language Processing. vol. 14, No. 4, Jul. 2006, pp. 1218-1234.
Cohen, Israel et al. "Microphone Array Post-Filtering for Non-Stationary Noise Suppression", IEEE International Conference on Acoustics, Speech, and Signal Processing, May 2002, pp. 1-4.
Cohen, Israel, "Multichannel Post-Filtering in Nonstationary Noise Environments", IEEE Transactions on Signal Processing, vol. 52, No. 5, May 2004, pp. 1149-1160.
Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.
Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.
"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.
Fuchs, Martin et al. "Noise Suppression for Automotive Applications Based on Directional Information", 2004 IEEE International Conference on Acoustics, Speech, and Signal Processing, May 17-21, pp. 237-240.
Fulghum, D. P. et al., "LPC Voice Digitizer with Background Noise Suppression", 1979 IEEE International Conference on Acoustics, Speech, and Signal Processing, pp. 220-223.
Goubran, R.A. "Acoustic Noise Suppression Using Regression Adaptive Filtering", 1990 IEEE 40th Vehicular Technology Conference, May 6-9, pp. 48-53.
Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.
Haykin, Simon et al. "Appendix A.2 Complex Numbers." Signals and Systems. 2nd Ed. 2003. p. 764.
Hermansky, Hynek "Should Recognizers Have Ears?", In Proc. ESCA Tutorial and Research Workshop on Robust Speech Recognition for Unknown Communication Channels, pp. 1-10, France 1997.
Hohmann, V. "Frequency Analysis and Synthesis Using a Gammatone Filterbank", ACTA Acustica United with Acustica, 2002, vol. 88, pp. 433-442.
Jeffress, Lloyd A. et al. "A Place Theory of Sound Localization," Journal of Comparative and Physiological Psychology, 1948, vol. 41, p. 35-39.
Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time-Domain Digital Cochlear Model", IEEE Transactions on Signal Processing, Dec. 1991, vol. 39, No. 12, pp. 2573-2592.
Lazzaro, John et al., "A Silicon Model of Auditory Localization," Neural Computation Spring 1989, vol. 1, pp. 47-57, Massachusetts Institute of Technology.
Lippmann, Richard P. "Speech Recognition by Machines and Humans", Speech Communication, Jul. 1997, vol. 22, No. 1, pp. 1-15.
Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.
Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.
Watts, Lloyd Narrative of Prior Disclosure of Audio Display on Feb. 15, 2000 and May 31, 2000.
Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Parra, Lucas et al. "Convolutive Blind Separation of Non-Stationary Sources", IEEE Transactions on Speech and Audio Processing. vol. 8, No. 3, May 2008, pp. 320-327.
Rabiner, Lawrence R. et al. "Digital Processing of Speech Signals", (Prentice-Hall Series in Signal Processing). Upper Saddle River, NJ: Prentice Hall, 1978.
Weiss, Ron et al., "Estimating Single-Channel Source Separation Masks: Revelance Vector Machine Classifiers vs. Pitch-Based Masking", Workshop on Statistical and Perceptual Audio Processing, 2006.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al. "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Syntrillium Software Corporation, "Cool Edit User's Manual", 1996, pp. 1-74.
Tashev, Ivan et al. "Microphone Array for Headset with Spatial Noise Suppressor", http://research.microsoft.com/users/ivantash/Documents/Tashev_MAforHeadset_HSCMA_05.pdf. (4 pages), 2005.
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.

(56) References Cited

OTHER PUBLICATIONS

Widrow, B. et al., "Adaptive Antenna Systems," Proceedings of the IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report dated Jun. 8, 2001 in Application No. PCT/US01/08372.
International Search Report dated Apr. 3, 2003 in Application No. PCT/US02/36946.

* cited by examiner

ADAPTIVE NOISE CANCELATION

CROSS-REFERENCE TO RELATED APPLICATIONS

The present application is related to U.S. patent application Ser. No. 12/215,980 filed Jun. 30, 2008 and entitled "System and Method for Providing Noise Suppression Utilizing Null Processing Noise Subtraction," U.S. Pat. No. 7,076,315 filed Mar. 24, 2000 and entitled "Efficient Computation of Log-Frequency-Scale Digital Filter Cascade," U.S. patent application Ser. No. 11/441,675 filed May 25, 2006 and entitled "System and Method for Processing an Audio Signal," U.S. patent application Ser. No. 12/286,909 filed Oct. 2, 2008 and entitled "Self Calibration of Audio Device," and U.S. patent application Ser. No. 12/319,107 filed Dec. 31, 2008 and entitled "Systems and Methods for Reconstructing Decomposed Audio Signals," of which the disclosures of all are incorporated herein by reference.

BACKGROUND OF THE INVENTION

1. Field of the Invention

The present invention relates generally to audio processing. More specifically, the present invention relates to controlling adaptivity of noise cancelation (i.e., noise cancellation) in an audio signal.

2. Related Art

Presently, there are many methods for reducing background noise in an adverse audio environment. Some audio devices that suppress noise utilize two or more microphones to receive an audio signal. Audio signals received by the microphones may be used in noise cancelation processing, which eliminates at least a portion of a noise component of a signal. Noise cancelation may be achieved by utilizing one or more spatial attributes derived from two or more microphone signals. In realistic scenarios, the spatial attributes of a wanted signal such as speech and an unwanted signal such as noise from the surroundings are usually different. Robustness of a noise reduction system can be adversely affected due to unanticipated variations of the spatial attributes for both wanted and unwanted signals. These unanticipated variations may result from variations in microphone sensitivity, variations in microphone positioning on audio devices, occlusion of one or more of the microphones, or movement of the device during normal usage. Accordingly, robust noise cancelation is needed that can adapt to various circumstances such as these.

SUMMARY OF THE INVENTION

Embodiments of the present technology allow control of adaptivity of noise cancelation in an audio signal.

In a first claimed embodiment, a method for controlling adaptivity of noise cancelation is disclosed. The method includes receiving an audio signal at a first microphone, wherein the audio signal comprises a speech component and a noise component. A pitch salience of the audio signal may then be determined. Accordingly, a coefficient applied to the audio signal may be adapted to obtain a modified audio signal when the pitch salience satisfies a threshold. In turn, the modified audio signal is outputted via an output device.

In a second claimed embodiment, a method is set forth. The method includes receiving a primary audio signal at a first microphone and a secondary audio signal at a second microphone. The primary audio signal and the secondary audio signal both comprise a speech component. An energy estimate is determined from the primary audio signal or the secondary audio signal. A first coefficient to be applied to the primary audio signal may be adapted to generate the modified primary audio signal, wherein the application of the first coefficient may be based on the energy estimate. The modified primary audio signal is then outputted via an output device.

A third claimed embodiment discloses a method for controlling adaptivity of noise cancellation. The method includes receiving a primary audio signal at a first microphone and a secondary audio signal at a second microphone, wherein the primary audio signal and the secondary audio signal both comprise a speech component. A first coefficient to be applied to the primary audio signal is adapted to generate the modified primary audio signal. The modified primary audio signal is outputted via an output device, wherein adaptation of the first coefficient is halted based on an echo component within the primary audio signal.

In a forth claimed embodiment, a method for controlling adaptivity of noise cancelation is set forth. The method includes receiving an audio signal at a first microphone. The audio signal comprises a speech component and a noise component. A coefficient is adapted to suppress the noise component of the audio signal and form a modified audio signal. Adapting the coefficient may include reducing the value of the coefficient based on an audio noise energy estimate. The modified audio signal may then be outputted via an output device.

A fifth claimed embodiment discloses a method for controlling adaptivity of noise cancelation. The method includes receiving a primary audio signal at a first microphone and a secondary audio signal at a second microphone, wherein the primary audio signal and the secondary audio signal both comprise a speech and a noise component. A first transfer function is determined between the speech component of the primary audio signal and the speech component of the secondary signal, while a second transfer function is determined between the noise component of the primary audio signal and the noise component of the secondary audio signal. Next, a difference between the first transfer function and the second transfer function is determined. A coefficient applied to the primary audio signal is adapted to generate a modified primary signal when the difference exceeds the threshold. The modified primary audio signal may be outputted via an output device.

Embodiments of the present technology may further include systems and computer-readable storage media. Such systems can perform methods associated with controlling adaptivity of noise cancelation. The computer-readable media has programs embodied thereon. The programs may be executed by a processor to perform methods associated with controlling adaptivity of noise cancelation.

DETAILED DESCRIPTION OF EXEMPLARY EMBODIMENTS

The present technology provides methods and systems for controlling adaptivity of noise cancelation of an audio signal. More specifically, these methods and systems allow noise cancelation to adapt to changing or unpredictable conditions. These conditions include differences in hardware resulting from manufacturing tolerances. Additionally, these conditions include unpredictable environmental factors such as changing relative positions of sources of wanted and unwanted audio signals.

Controlling adaptivity of noise cancelation can be performed by controlling how a noise component is canceled in an audio signal received from one of two microphones. All or most of a speech component can be removed from an audio signal received from one of two or more microphones, resulting in a noise reference signal or a residual audio signal. The resulting residual audio signal is then processed or modified and can be then subtracted from the original primary audio signal, thereby reducing noise in the primary audio signal generating a modified audio signal. One or more coefficients can be applied to cancel or suppress the speech component in the primary signal (to generate the residual audio signal) and then to cancel or suppress at least a portion of the noise component in the primary signal (to generate the modified primary audio signal).

Figure 1:
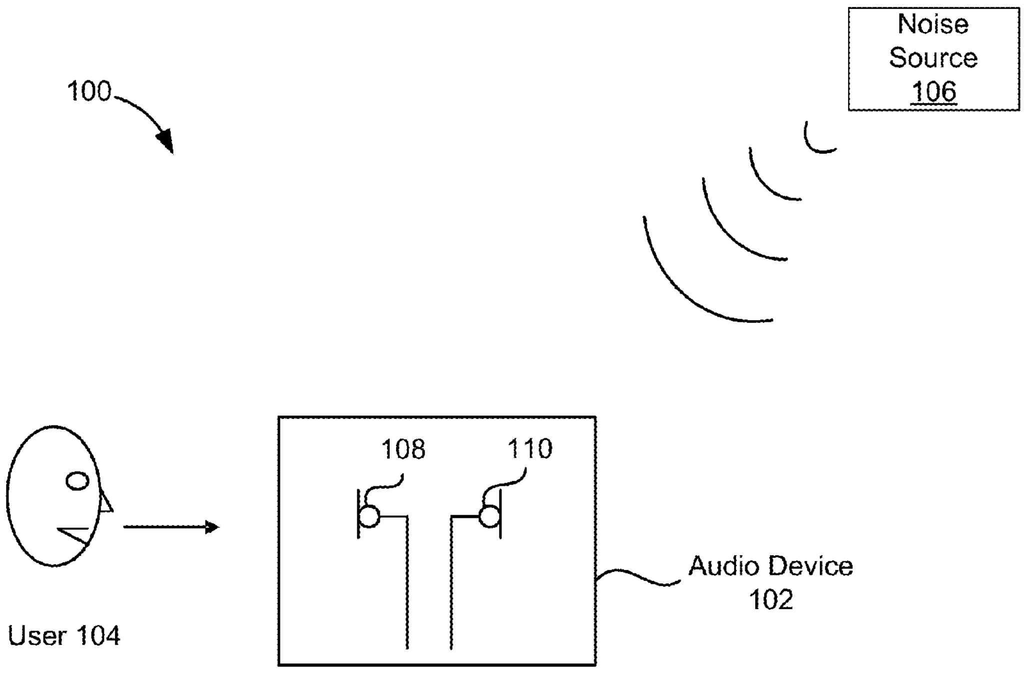
FIG. 1 is a block diagram of an exemplary environment for practicing embodiments of the present technology.

Referring now to FIG. 1, a block diagram is presented of an exemplary environment 100 for practicing embodiments of the present technology. The environment 100, as depicted, includes an audio device 102, a user 104 of the audio device 102, and a noise source 106. It is noteworthy that there may be several noise sources in the environment 100 similar to the noise source 106. Furthermore, although the noise source 106 is shown coming from a single location in FIG. 1, the noise source 106 may include any sounds from one or more locations different than the user 104, and may include reverberations and echoes. The noise source 106 may be stationary, non-stationary, or a combination of both stationary and non-stationary noise sources.

The audio device 102 may include a microphone array. In exemplary embodiments, the microphone array may comprise a primary microphone 108 relative to the user 104 and a secondary microphone 110 located a distance away from the primary microphone 108. The primary microphone 108 may be located near the mouth of the user 104 in a nominal usage position, which is described in connection with FIG. 2B. While embodiments of the present technology will be discussed with regards to the audio device 102 having two microphones (i.e., the primary microphone 108 and the secondary microphone 110), alternative embodiments may contemplate any number of microphones or acoustic sensors within the microphone array. Additionally, the primary microphone 108 and/or the secondary microphone 110 may include omni-directional microphones in accordance with some embodiments.

Figure 2A:
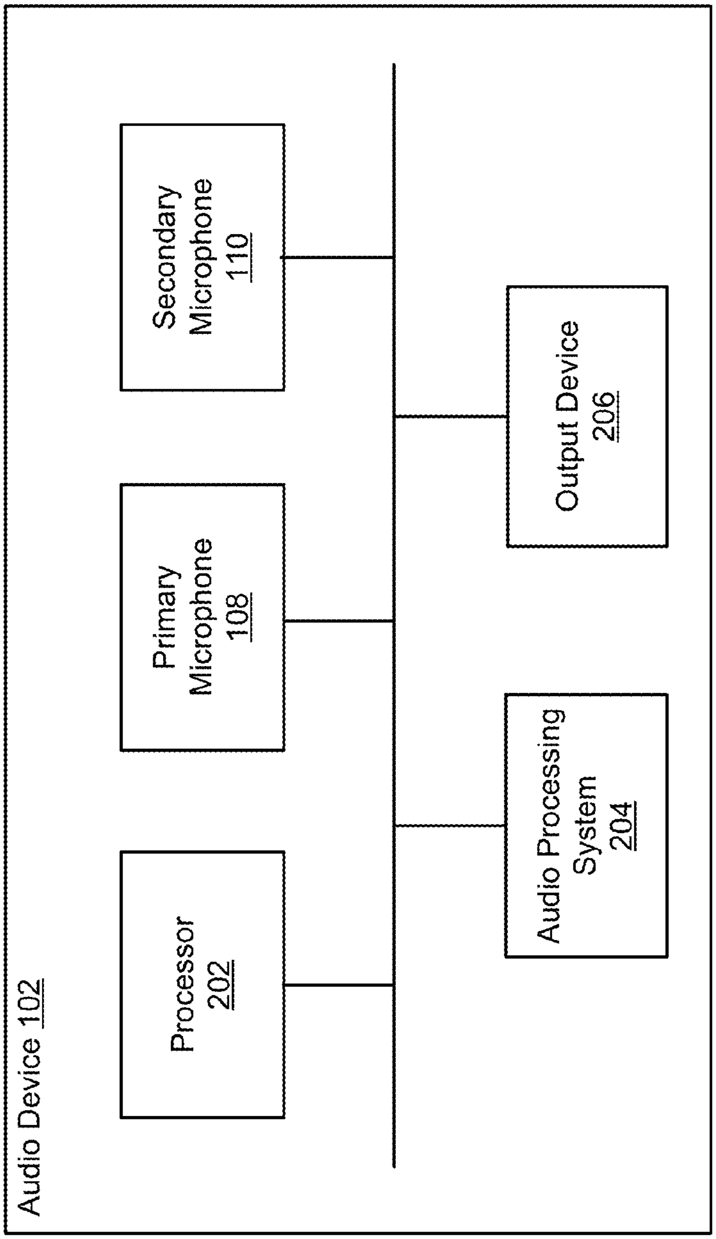
FIG. 2A is a block diagram of an exemplary audio device implementing embodiments of the present technology.

FIG. 2A is a block diagram illustrating the exemplary audio device 102 in further detail. As depicted, the audio device 102 includes a processor 202, the primary microphone 108, the secondary microphone 110, an audio processing system 204, and an output device 206. The audio device 102 may comprise further components (not shown) necessary for audio device 102 operations. For example, the audio device 102 may include memory (not shown) that comprises a computer readable storage medium. Software such as programs or other executable code may be stored on a memory within the audio device. The processor 202 may include and may execute software and/or firmware that may execute various modules described herein. The audio processing system 204 will be discussed in more detail in connection with FIG. 3.

In exemplary embodiments, the primary and secondary microphones 108 and 110 are spaced a distance apart. This spatial separation allows various differences to be determined between received acoustic signals. These differences may be used to determine relative locations of the user 104 and the noise source 106. Upon receipt by the primary and secondary microphones 108 and 110, the acoustic signals may be converted into electric signals. The electric signals may, themselves, be converted by an analog-to-digital converter (not shown) into digital signals for processing in accordance with some embodiments. In order to differentiate the acoustic signals, the acoustic signal received by the primary microphone 108 is herein referred to as the primary signal, while the acoustic signal received by the secondary microphone 110 is herein referred to as the secondary signal.

The primary microphone 108 and the secondary microphone 110 both receive a speech signal from the mouth of the user 104 and a noise signal from the noise source 106. These signals may be converted from the time-domain to the frequency-domain, and be divided into frequency sub-bands, as described further herein. The total signal received by the primary microphone 108 (i.e., the primary signal c) may be represented as a superposition of the speech signal s and of the noise signal n as $c=s+n$. In other words, the primary signal is a mixture of a speech component and a noise component.

Due to the spatial separation of the primary microphone 108 and the secondary microphone 110, the speech signal received by the secondary microphone 110 may have an amplitude difference and a phase difference relative to the speech signal received by the primary microphone 108. Similarly, the noise signal received by the secondary microphone 110 may have an amplitude difference and a phase difference relative to the noise signal received by the primary microphone 108. These amplitude and phase differences can be represented by complex coefficients. Therefore, the total signal received by the secondary microphone 110 (i.e., the secondary signal f) may be represented as a superposition of the speech signal s scaled by a first complex coefficient $\sigma$ and of the noise signal n scaled by a second complex coefficient v as $f=\sigma s+vn$. Put differently, the secondary signal is a mixture of the speech component and noise component of the primary signal, wherein both the speech component and noise component are independently scaled in amplitude and shifted in phase relative to the primary signal. It is noteworthy that a diffuse noise component may be present in both the primary and secondary signals. In such a case, the primary signal may be represented as $c=s+n+d$, while the secondary signal may be represented as $f=\sigma s+vn+e$.

The output device 206 is any device which provides an audio output to users such as the user 104. For example, the output device 206 may comprise an earpiece of a headset or handset, or a speaker on a conferencing device. In some embodiments, the output device 206 may also be a device that outputs or transmits audio signals to other devices or users.

Figure 2B:
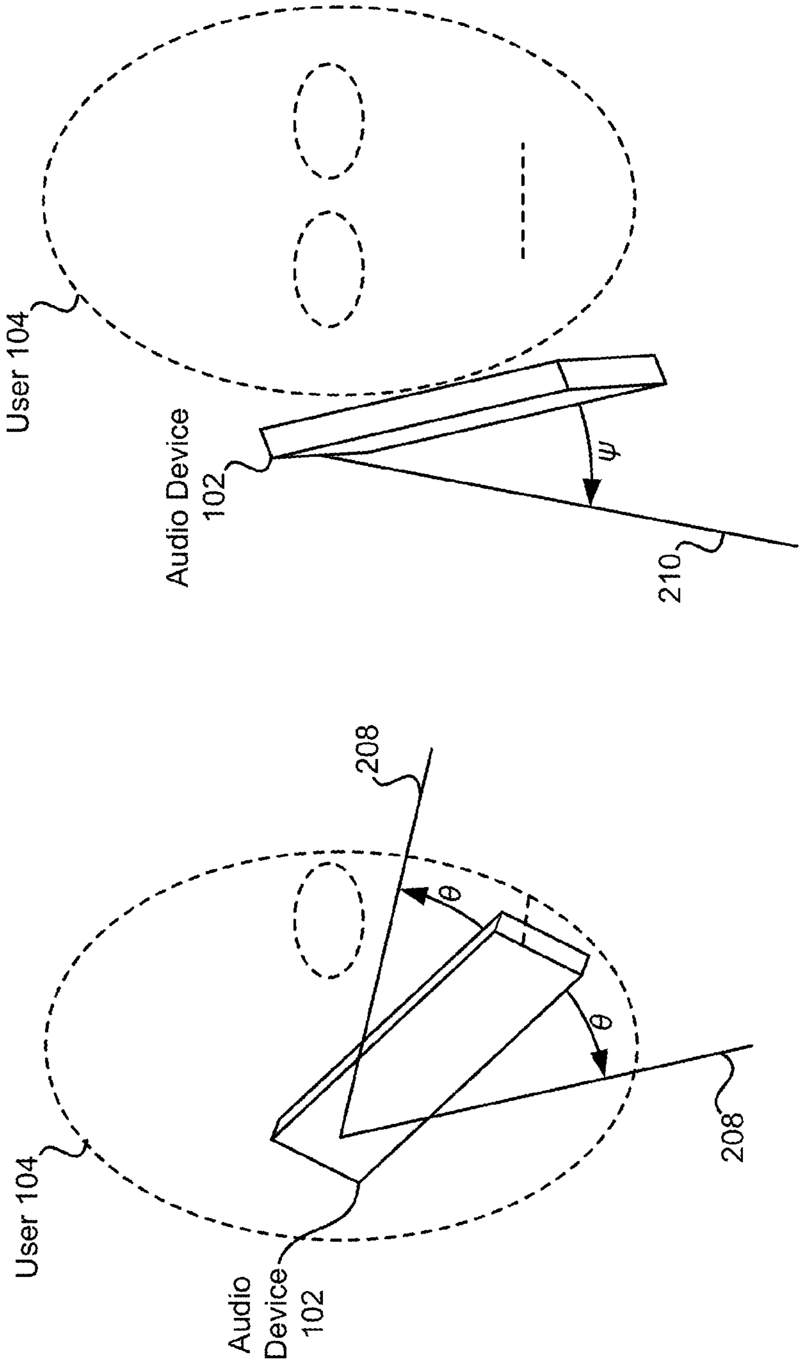
FIG. 2B illustrates a typical usage position of the audio device and variations from that position during normal usage.

FIG. 2B illustrates a typical usage position of the audio device 102 and variations from that position during normal usage. The displacement of audio device 102 from a given nominal usage position relative to the user 104 may be described using the position range 208 and the position range 210. The audio device 102 is typically positioned relative to the user 104 such that an earpiece or speaker of the audio device 102 is aligned proximal to an ear of the user 104 and the primary microphone 108 is aligned proximal to the mouth of the user 104. The position range 208 indicates that the audio device 102 can be pivoted roughly at the ear of the user 104 up or down by an angle θ. In addition, the position range 210 indicates that the audio device 102 can be pivoted roughly at the ear of the user 104 out by an angle ψ. To cover realistic usage scenarios, the angles θ and ψ can be assumed to be at least 30 degrees. However, the angles θ and ψ may vary depending on the user 104 and conditions of the environment 100.

Figure 3:
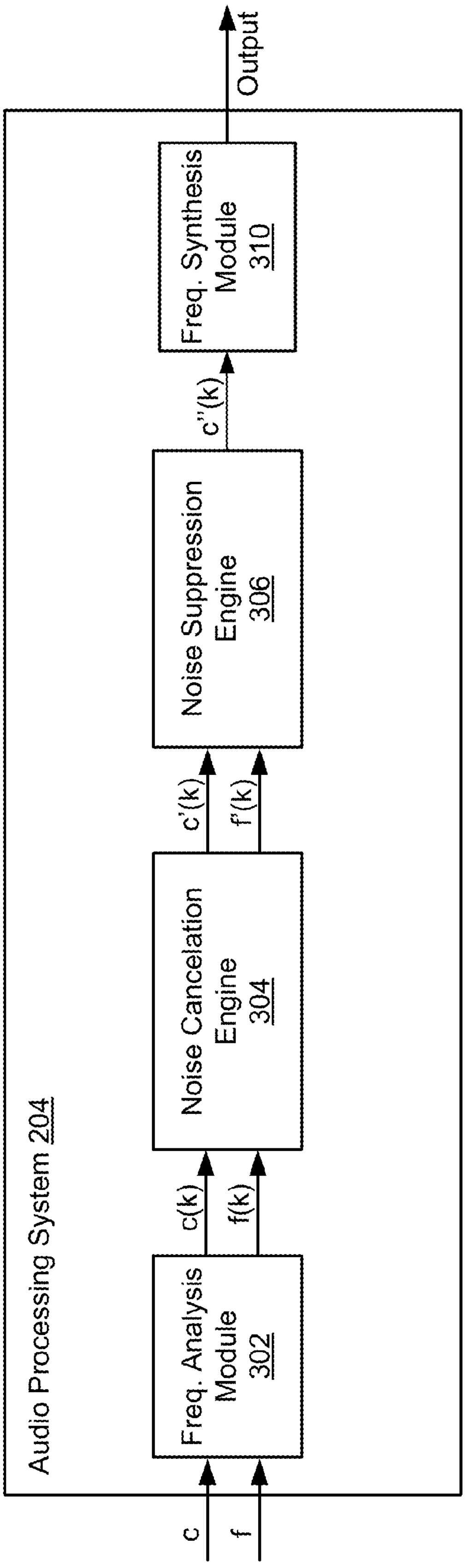
FIG. 3 is a block diagram of an exemplary audio processing system included in the audio device.

Referring now to FIG. 3, a block diagram of the exemplary audio processing system 204 included in the audio device 102 is presented. In exemplary embodiments, the audio processing system 204 is embodied within a memory (not shown) of the audio device 102. As depicted, the audio processing system 204 includes a frequency analysis module 302, a noise cancelation engine 304, a noise suppression engine (also referred to herein as noise suppression module) 306, and a frequency synthesis module 310. These modules and engines may be executed by the processor 202 of the audio device 102 to effectuate the functionality attributed thereto. The audio processing system 204 may be composed of more or less modules and engines (or combinations of the same) and still fall within the scope of the present technology. For example, the functionality of the frequency analysis module 302 and the frequency synthesis module 310 may be combined into a single module.

The primary signal c and the secondary signal f are received by the frequency analysis module 302. The frequency analysis module 302 decomposes the primary and secondary signals into frequency sub-bands. Because most sounds are complex and comprise more than one frequency, a sub-band analysis on the primary and secondary signals determines what individual frequencies are present. This analysis may be performed on a frame by frame basis. A frame is a predetermined period of time. According to one embodiment, the frame is 8 ms long. Alternative embodiments may utilize other frame lengths or no frame at all.

A sub-band results from a filtering operation on an input signal (e.g., the primary signal or the secondary signal) where the bandwidth of the filter is narrower than the bandwidth of the signal received by the frequency analysis module 302. In one embodiment, the frequency analysis module 302 utilizes a filter bank to mimic the frequency response of a human cochlea. This is described in further detail in U.S. Pat. No. 7,076,315 filed Mar. 24, 2000 and entitled "Efficient Computation of Log-Frequency-Scale Digital Filter Cascade," and U.S. patent application Ser. No. 11/441,675 filed May 25, 2006 and entitled "System and Method for Processing an Audio Signal," both of which have been incorporated herein by reference. Alternatively, other filters such as short-time Fourier transform (STFT), sub-band filter banks, modulated complex lapped transforms, cochlear models, wavelets, etc., can be used by the frequency analysis module 302. The decomposed primary signal is expressed as c(k), while the decomposed secondary signal is expressed as f(k), where k indicates the specific sub-band.

The decomposed signals c(k) and f(k) are received by the noise cancelation module 304 from the frequency analysis module 302. The noise cancelation module 304 performs noise cancelation on the decomposed signals using subtractive approaches. In exemplary embodiments, the noise subtraction engine 304 may adaptively subtract out some or the entire noise signal from the primary signal for one or more sub-bands. The results of the noise cancelation engine 304 may be outputted to the user or processed through a further noise suppression system (e.g., the noise suppression engine 306). For purposes of illustration, embodiments of the present technology will discuss the output of the noise cancelation engine 304 as being processed through a further noise suppression system. The noise cancelation module 304 is discussed in further detail in connection with FIGS. 4A, 4B and 4C.

As depicted in FIG. 3, after processing by the noise cancelation module 304, the primary and secondary signals are received by the noise suppression module 306 as c'(k) and f'(k). The noise suppression module 306 performs noise suppression using multiplicative approaches. According to exemplary embodiments, the noise suppression engine 306 generates gain masks to be applied to one or more of the sub-bands of the primary signal c'(k) in order to further reduce noise components that may remain after processing by the noise cancelation engine 304. This is described in further detail in U.S. patent application Ser. No. 12/286,909 filed Oct. 2, 2008 and entitled "Self Calibration of Audio Device," which has been incorporated herein by reference. The noise suppression module 306 outputs the further processed primary signal as c"(k).

Next, the decomposed primary signal c"(k) is reconstructed by the frequency synthesis module 310. The reconstruction may include phase shifting the sub-bands of the primary signal in the frequency synthesis module 310. This is described further in U.S. patent application Ser. No. 12/319,107 filed Dec. 31, 2008 and entitled "Systems and Methods for Reconstructing Decomposed Audio Signals," which has been incorporated herein by reference. An inverse of the decomposition process of the frequency analysis module 302 may be utilized by the frequency synthesis module 310. Once reconstruction is completed, the noise suppressed primary signal may be outputted by the audio processing system 204.

Figure 4A:
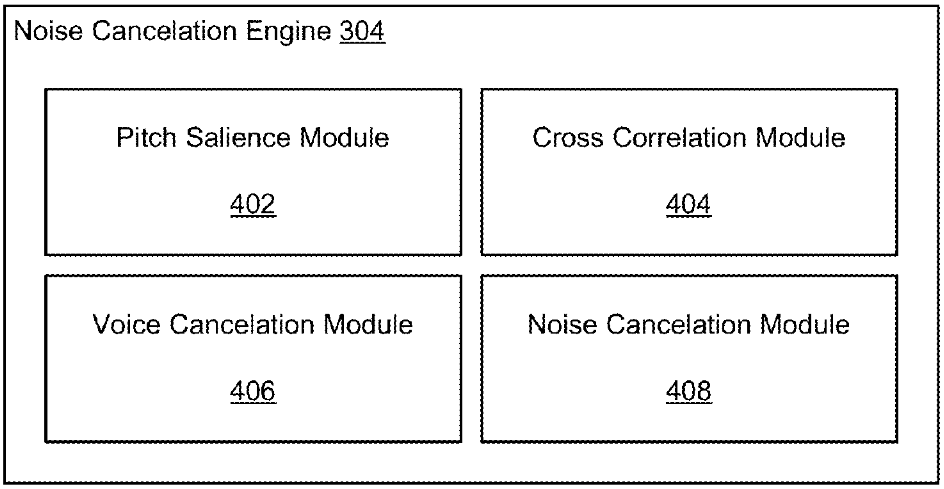
FIG. 4A is a block diagram of an exemplary noise cancelation engine included in the audio processing system.

FIG. 4A is a block diagram of the exemplary noise cancelation engine 304 included in the audio processing system 204. The noise cancelation engine 304, as depicted, includes a pitch salience module 402, a cross correlation module 404, a voice cancelation module 406, and a noise cancelation module 408. These modules may be executed by the processor 202 of the audio device 102 to effectuate the functionality attributed thereto. The noise cancelation engine 304 may be composed of more or less modules (or combinations of the same) and still fall within the scope of the present technology.

The pitch salience module 402 is executable by the processor 202 to determine the pitch salience of the primary signal. In exemplary embodiments, pitch salience may be determined from the primary signal in the time-domain. In other exemplary embodiments, determining pitch salience includes converting the primary signal from the time-domain to the frequency-domain. Pitch salience can be viewed as an estimate of how periodic the primary signal is and, by extension, how predictable the primary signal is. To illustrate, pitch salience of a perfect sine wave is contrasted with pitch salience of white noise. Since a perfect sine wave is purely periodic and has no noise component, the pitch salience of the sine wave has a large value. White noise, on the other hand, has no periodicity by definition, so the pitch salience of white noise has a small value. Voiced components of speech typically have a high pitch salience, and can thus be distinguished from many types of noise, which have a low pitch salience. It is noted that the pitch salience module 402 may also determine the pitch salience of the secondary signal.

The cross correlation module 404 is executable by the processor 202 to determine transfer functions between the primary signal and the secondary signal. The transfer functions include complex values or coefficients for each sub-band. One of these complex values denoted by $\hat{\sigma}$ is associated with the speech signal from the user 104, while another complex value denoted by $\hat{v}$ is associated with the noise signal from the noise source 106. More specifically, the first complex value $\hat{\sigma}$ for each sub-band represents the difference in amplitude and phase between the speech signal in the primary signal and the speech signal in the secondary signal for the respective sub-band. In contrast, the second complex value $\hat{v}$ for each sub-band represents the difference in amplitude and phase between the noise signal in the primary signal and the noise signal in the secondary signal for the respective sub-band. In exemplary embodiments, the transfer function may be obtained by performing a cross-correlation between the primary signal and the secondary signal.

The first complex value $\hat{\sigma}$ of the transfer function may have a default value or reference value $\sigma_{ref}$ that is determined empirically through calibration. A head and torso simulator (HATS) may be used for such calibration. A HATS system generally includes a mannequin with built-in ear and mouth simulators that provides a realistic reproduction of acoustic properties of an average adult human head and torso. HATS systems are commonly used for in situ performance tests on telephone handsets. An exemplary HATS system is available from Brüel & Kjar Sound & Vibration Measurement A/S of Narum, Denmark. The audio device 102 can be mounted to a mannequin of a HATS system. Sounds produced by the mannequin and received by the primary and secondary microphones 108 and 110 can then be measured to obtain the reference value $\sigma_{ref}$ of the transfer function. Obtaining the phase difference between the primary signal and the secondary signal can be illustrated by assuming that the primary microphone 108 is separated from the secondary microphone 110 by a distance d. The phase difference of a sound wave (of a single frequency) incident on the two microphones is proportional to the frequency $f_{sw}$ of the sound wave and the distance d. This phase difference can be approximated analytically as $\phi \approx 2\pi f_{sw} d \cos(\beta)/c$, where c is the speed of sound and $\beta$ is the angle of incidence of the sound wave upon the microphone array.

The voice cancelation module 406 is executable by the processor 202 to cancel out or suppress the speech component of the primary signal. According to exemplary embodiments, the voice cancelation module 406 achieves this by utilizing the first complex value $\hat{\sigma}$ of the transfer function determined by the cross-correlation module 404. A signal entirely or mostly devoid of speech may be obtained by subtracting the product of the primary signal c(k) and $\hat{\sigma}$ from the secondary signal on a sub-band by sub-band basis. This can be expressed as $$f(k)-\hat{\sigma}\cdot c(k)\approx f(k)-\sigma\cdot c(k)=(v-\sigma)n(k)$$

when $\hat{\sigma}$ is approximately equal to $\sigma$. The signal expressed by $(v-\sigma)n(k)$ is a noise reference signal or a residual audio signal, and may be referred to as a speech-devoid signal.

Figure 4B:
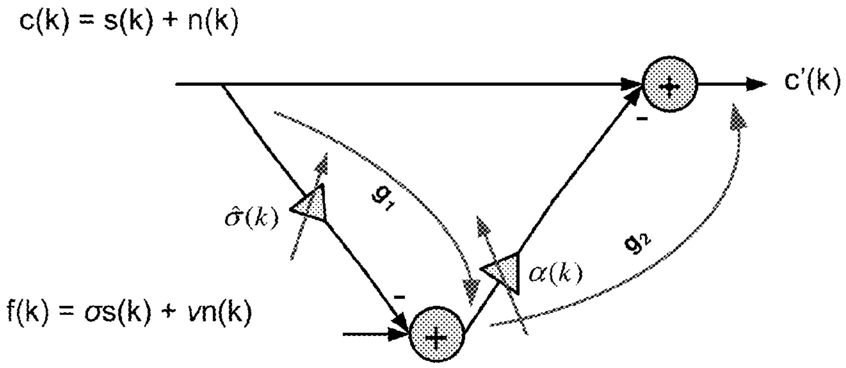
FIG. 4B is a schematic illustration of operations of the noise cancelation engine in a particular frequency sub-band.

FIG. 4B is a schematic illustration of operations of the noise cancelation engine 304 in a particular frequency sub-band. The primary signal c(k) and the secondary signal f(k) are inputted at the left. The schematic of FIG. 4B shows two branches. In the first branch, the primary signal c(k) is multiplied by the first complex value $\hat{\sigma}$. That product is then subtracted from the secondary signal f(k), as described above, to obtain the speech-devoid signal $(v-\sigma)n(k)$. These operations are performed by the voice cancelation module 406. The gain parameter $g_1$ represents the ratio between primary signal and the speech-devoid signal. FIG. 4B is revisited below with respect to the second branch.

Under certain conditions, the value of $\hat{\sigma}$ may be adapted to a value that is more effective in canceling the speech component of the primary signal. This adaptation may be subject to one or more constraints. Generally speaking, adaptation may be desirable to adjust for unpredicted occurrences. For example, since the audio device 102 can be moved around as illustrated in FIG. 2B, the actual transfer function for the noise source 106 between the primary signal and the secondary signal may change. Additionally, differences in predicted position and sensitivity of the primary and secondary microphones 108 and 110 may cause the actual transfer function between the primary signal and the secondary signal to deviate from the value determined by calibration. Furthermore, in some embodiments, the secondary microphone 110 is placed on the back of the audio device 102. As such, a hand of the user 104 can create an occlusion or an enclosure over the secondary microphone 110 that may distort the transfer function for the noise source 106 between the primary signal and the secondary signal.

The constraints for adaptation of $\hat{\sigma}$ by the voice cancelation module 406 may be divided into sub-band constraints and global constraints. Sub-band constraints are considered individually per sub-band, while global constraints are considered over multiple sub-bands. Sub-band constraints may also be divided into level and spatial constraints. All constraints are considered on a frame by frame basis in exemplary embodiments. If a constraint is not met, adaptation of $\hat{\sigma}$ may not be performed. Furthermore, in general, $\hat{\sigma}$ is adapted within frames and sub-bands that are dominated by speech.

One sub-band level constraint is that the energy of the primary signal is some distance away from the stationary noise estimate. This may help prevent maladaptation with quasi-stationary noise. Another sub-band level constraint is that the primary signal energy is at least as large as the minimum expected speech level for a given frame and sub-band. This may help prevent maladaptation with noise that is low level. Yet another sub-band level constraint is that $\hat{\sigma}$ should not be adapted when a transfer function or energy difference between the primary and secondary microphones indicates that echoes are dominating a particular sub-band or frame. In one exemplary embodiment, for microphone configurations where the secondary microphone is closer to a loudspeaker or earpiece than the primary microphone, $\hat{\sigma}$ should not be adapted when the secondary signal has a greater magnitude than the primary signal. This may help prevent adaptation to echoes.

Figure 4C:
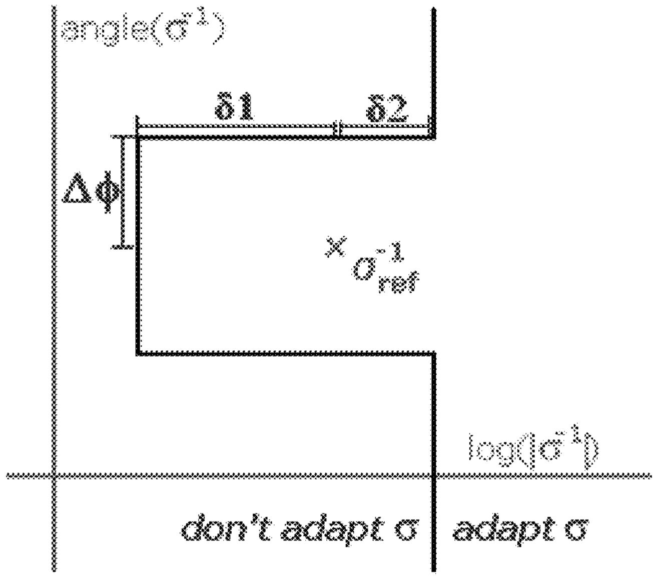
FIG. 4C illustrates a spatial constraint associated with adaptation by modules of the noise cancelation engine.

A sub-band spatial constraint for adaptation of $\hat{\sigma}$ by the voice cancelation module 406 may be applied for various frequency ranges. FIG. 4C illustrates one spatial constraint for a single sub-band. In exemplary embodiments, this spatial constraint may be invoked for sub-bands below approximately 0.5-1 kHz. The x-axis in FIG. 4C generally corresponds to the inter-microphone level difference (ILD) expressed as $$\log(|\sigma^{-1}|)$$

between the primary signal and the secondary signal, where high ILD is to the right and low ILD is to the left. Conventionally, the ILD is positive for speech since the primary microphone is generally closer to the mouth than the secondary microphone. The y-axis marks the angle of the complex coefficient σ that denotes the phase difference between the primary and secondary signal. The 'x' marks the location of the reference value $\sigma_{ref}^{-1}$ determined through calibration. The parameters Δφ, δ1, and δ2 define a region in which $\hat{\sigma}$ may be adapted by the voice cancelation module 406. The parameter Δφ may be proportional to the center frequency of the sub-band and the distance between the primary microphone 108 and the secondary microphone 110. Additionally, in some embodiments, a leaky integrator may be used to smooth the value of $\hat{\sigma}$ over time.

Another sub-band spatial constraint is that the magnitude of $\sigma^{-1}$ for the speech signal $$|\sigma^{-1}|$$

should be greater than the magnitude of $v^{-1}$ for the noise signal $$|v^{-1}|$$

in a given frame and sub-band. Furthermore, v may be adapted when speech is not active based on any or all of the individual sub-band and global constraints controlling adaptation of $\hat{\sigma}$ and other constraints not embodied in adaptation of $\hat{\sigma}$. This constraint may help prevent maladaptation within noise that may arrive from a spatial location that is within the permitted σ adaptation region defined by the first sub-band spatial constraint.

As mentioned, global constraints are considered over multiple sub-bands. One global constraint for adaptation of $\hat{\sigma}$ by the voice cancelation module 406 is that the pitch salience of the primary signal determined by the pitch salience module 402 exceeds a threshold. In exemplary embodiments, this threshold is 0.7, where a value of 1 indicates perfect periodicity, and a value of zero indicates no periodicity. A pitch salience threshold may also be applied to individual sub-bands and, therefore, be used as a sub-band constraint rather than a global restraint. Another global constraint for adaptation of $\hat{\sigma}$ may be that a minimum number of low frequency sub-bands (e.g., sub-bands below approximately 0.5-1 kHz) must satisfy the sub-band level constraints described herein. In one embodiment, this minimum number equals half of the sub-bands. Yet another global constraint is that a minimum number of low frequency sub-bands that satisfy the sub-band level constraints should also satisfy the sub-band spatial constraint described in connection with FIG. 4C.

Referring again to FIG. 4A, the noise cancelation module 408 is executable by the processor 202 to cancel out or suppress the noise component of the primary signal. The noise cancelation module 408 subtracts a noise signal from the primary signal to obtain a signal dominated by the speech component. In exemplary embodiments, the noise signal is derived from the speech-devoid signal (i.e., (v−σ)n(k)) of the voice cancelation module 406 by multiplying that signal by a coefficient α(k) on a sub-band by sub-band basis. Accordingly, the coefficient α has a default value equal to $(v-\sigma)^{-1}$. However, the coefficient α(k) may also be adapted under certain conditions and be subject to one or more constraints.

Returning to FIG. 4B, the coefficient α(k) is depicted in the second branch. The speech-devoid signal (i.e., (v−σ)n(k)) is multiplied by α(k), and then that product is subtracted from the primary signal c(k) to obtain a modified primary signal c'(k). These operations are performed by the noise cancelation module 408. The gain parameter $g_2$ represents the ratio between the speech-devoid signal and c'(k). In exemplary embodiments, the signal c'(k) will be dominated by the speech signal received by the primary microphone 108 with minimal contribution from the noise signal.

The coefficient α can be adapted for changes in noise conditions in the environment 100 such as a moving noise source 106, multiple noise sources or multiple reflections of a single noise source. One constraint is that the noise cancelation module 408 only adapts α when there is no speech activity. Thus, α is only adapted when $\hat{\sigma}$ is not being adapted by the voice cancelation module 406. Another constraint is that a should adapt towards zero (i.e., no noise cancelation) if the primary signal, secondary signal, or speech-devoid signal (i.e., (v−σ)n(k)) of the voice cancelation module 406 is below some minimum energy threshold. In exemplary embodiments, the minimum energy threshold may be based upon an energy estimate of the primary or secondary microphone self-noise.

Yet another constraint for adapting a is that the following equation is satisfied:

$$g_2 \cdot \gamma > \frac{g_1}{\gamma},$$

where $$\gamma = \sqrt{2} / |\hat{v} - \hat{\sigma}|^2$$

and $\hat{\mathbf{v}}$ is a complex value which estimates the transfer function between the primary and secondary microphone signals for the noise source. The value of 13 may be adapted based upon a noise activity detector, or any or all of the constraints that are applied to adaptation of the voice cancelation module 406. This condition implies that more noise is being canceled relative to speech. Conceptually, this may be viewed as noise activity detection. The left side of the above equation ($g_2 \cdot \gamma$) is related to the signal to noise ratio (SNR) of the output of the noise cancelation engine 304, while the right side of the equation ($g_1/\gamma$) is related to the SNR of the input of the noise cancelation engine 304. It is noteworthy that γ is not a fixed value in exemplary embodiments since actual values of $\hat{v}$ and $\hat{\sigma}$ can be estimated using the cross correlation module 404 and voice cancelation module 406. As such, the difference between $\hat{v}$ and $\hat{\sigma}$ must be less than a threshold to satisfy this condition.

Figure 5:
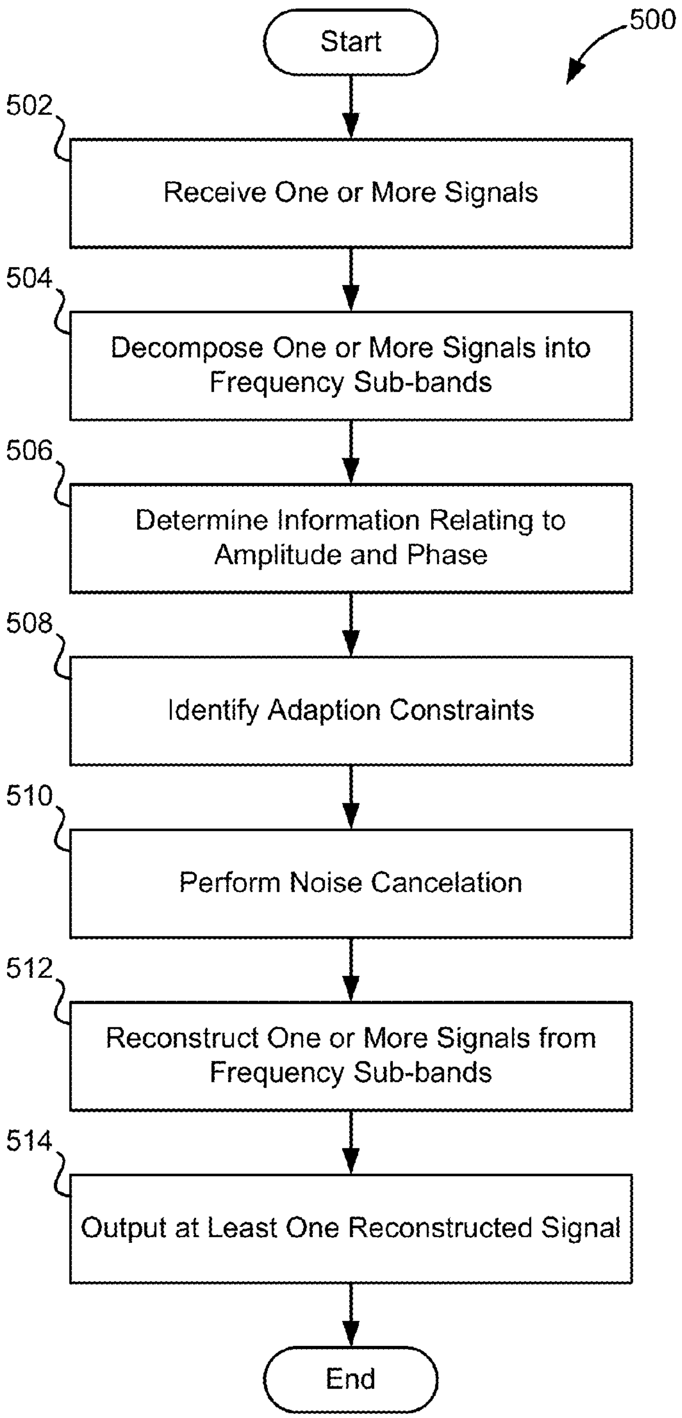
FIG. 5 is a flowchart of an exemplary method for controlling adaptivity of noise cancelation.

FIG. 5 is a flowchart of an exemplary method 500 for controlling adaptivity of noise cancelation. The method 500 may be performed by the audio device 102 through execution of various engines and modules described herein. The steps of the method 500 may be performed in varying orders. Additionally, steps may be added or subtracted from the method 500 and still fall within the scope of the present technology.

In step 502, one or more signals are received. In exemplary embodiments, these signals comprise the primary signal received by the primary microphone 108 and the secondary signal received by the secondary microphone 110. These signals may originate at a user 104 and/or a noise source 106. Furthermore, the received one or more signals may each include a noise component and a speech component.

In step 504, the received one or more signals are decomposed into frequency sub-bands. In exemplary embodiments, step 504 is performed by execution of the frequency analysis module 302 by the processor 202.

In step 506, information related to amplitude and phase is determined for the received one or more signals. This information may be expressed by complex values. Moreover, this information may include transfer functions that indicate amplitude and phase differences between two signals or corresponding frequency sub-bands of two signals. Step 506 may be performed by the cross correlation module 404.

In step 508, adaptation constraints are identified. The adaptation constraints may control adaptation of one or more coefficients applied to the one or more received signals. The one or more coefficients (e.g., $\hat{\sigma}$ or $\alpha$) may be applied to suppress a noise component or a speech component.

One adaptation constraint may be that a determined pitch salience of the one or more received signals should exceed a threshold in order to adapt a coefficient (e.g., $\hat{\sigma}$).

Another adaptation constraint may be that a coefficient (e.g., $\hat{\sigma}$) should be adapted when an amplitude difference between two received signals is within a first predetermined range and a phase difference between the two received signals is within a second predetermined range.

Yet another adaptation constraint may be that adaptation of a coefficient (e.g., $\hat{\sigma}$) should be halted when echo is determined to be in either microphone, for example, based upon a comparison between the amplitude of a primary signal and an amplitude of a secondary signal.

Still another adaptation constraint is that a coefficient (e.g., $\alpha$) should be adjusted to zero when an amplitude of a noise component is less than a threshold. The adjustment of the coefficient to zero may be gradual so as to fade the value of the coefficient to zero over time. Alternatively, the adjustment of the coefficient to zero may be abrupt or instantaneous.

One other adaptation constraint is that a coefficient (e.g., $\alpha$) should be adapted when a difference between two transfer functions exceeds or is less than a threshold, one of the transfer functions being an estimate of the transfer function between a speech component of a primary signal and a speech component of a secondary signal, and the other transfer function being an estimate of the transfer function between a noise component of the primary signal and a noise component of the secondary signal.

In step 510, noise cancelation consistent with the identified adaptation constraints is performed on the one or more received signals. In exemplary embodiments, the noise cancelation engine 304 performs step 510.

In step 512, the one or more received signals are reconstructed from the frequency sub-bands. The frequency synthesis module 310 performs step 512 in accordance with exemplary embodiments.

In step 514, at least one reconstructed signal is outputted. In exemplary embodiments, the reconstructed signal is outputted via the output device 206.

It is noteworthy that any hardware platform suitable for performing the processing described herein is suitable for use with the technology. Computer-readable storage media refer to any medium or media that participate in providing instructions to a central processing unit (CPU) such as the processor 202 for execution. Such media can take forms, including, but not limited to, non-volatile and volatile media such as optical or magnetic disks and dynamic memory, respectively. Common forms of computer-readable storage media include a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for controlling adaptivity of noise cancellation, the method comprising:

adapting, using at least one hardware processor, a coefficient to suppress a noise component of a primary audio signal and form a modified audio signal, the primary audio signal representing a first captured sound and comprising a speech component and the noise component; and outputting the modified audio signal via an output device, wherein adapting the coefficient includes reducing a value of the coefficient based on an audio noise energy estimate, the coefficient being faded to zero when the audio noise energy estimate is less than a threshold, the threshold being determined based on an estimate of the microphone self-noise in the primary or a secondary audio signal, the secondary audio signal representing a second captured sound.

2. The method of claim 1, wherein the coefficient is faded to about zero based on the noise energy estimate.

3. The method of claim 1, wherein the noise energy estimate may be determined from the primary audio signal, the secondary audio signal or a residual audio signal derived from a difference of the primary audio signal and the speech component of the primary audio signal.

4. The method of claim 3, wherein the noise energy estimate is performed on individual frequency sub-bands of the residual audio signal.

5. A method for controlling adaptivity of noise cancellation, the method comprising:

determining, using at least one hardware processor, a first transfer function between a speech component of a primary audio signal and a speech component of a secondary audio signal, the primary audio signal representing a first captured sound and comprising the speech component and a noise component, and the secondary audio signal representing a second captured sound and comprising the speech component and a noise component;

determining a second transfer function between the noise component of the primary audio signal and the noise component of the secondary audio signal;

determining a difference between the first transfer function and the second transfer function;

adapting a coefficient applied to the primary audio signal to generate a modified primary audio signal when the difference exceeds a threshold; and outputting the modified primary audio signal via an output device.

6. The method of claim 5, further comprising:

adapting a first coefficient to suppress the speech component of the primary audio signal thus forming a residual audio signal;

adapting a second coefficient applied to the residual audio signal when a difference exceeds the threshold to obtain a noise prediction audio signal; and subtracting the noise prediction audio signal from the primary audio signal to generate a modified primary signal.

7. The method of claim 6, wherein adapting the second coefficient is performed on individual frequency sub-bands of the primary audio signal.

8. The method of claim 6, wherein determining the first transfer function and the second transfer function comprises cross-correlating the primary audio signal and the secondary audio signal.

9. The method of claim 6, wherein the second coefficient is adapted when an estimate of far-end activity exceeds the threshold.

10. A non-transitory computer-readable storage medium having a program embodied thereon, the program executable by a processor to perform a method for controlling adaptivity of noise cancellation, the method comprising:

determining a first transfer function between a speech component of a primary audio signal and a speech component of a secondary signal, the primary audio signal representing a first captured sound and comprising the speech component and a noise component, and the secondary audio signal representing a second captured sound and comprising the speech component and the noise component;

determining a second transfer function between the noise component of the primary audio signal and the noise component of the secondary audio signal;

determining a difference between the first transfer function and the second transfer function;

adapting a coefficient applied to the primary audio signal to generate a modified primary audio signal when the difference exceeds a threshold; and outputting the modified primary audio signal via an output device.

11. The non-transitory computer-readable storage medium of claim 10, the method further comprising:

adapting a first coefficient to suppress the speech component of the primary audio signal thus forming a residual audio signal;

adapting a second coefficient applied to the residual audio signal when the difference exceeds the threshold to obtain a noise prediction audio signal; and subtracting the noise prediction audio signal from the primary audio signal to generate a modified primary signal.

12. The non-transitory computer-readable storage medium of claim 11, wherein adapting the second coefficient is performed on individual frequency sub-bands of the primary audio signal.

13. The non-transitory computer-readable storage medium of claim 11, wherein determining the first transfer function and the second transfer function comprises cross-correlating the primary audio signal and the secondary audio signal.

14. The non-transitory computer-readable storage medium of claim 11, wherein the second coefficient is adapted when an estimate of far-end activity exceeds the threshold.

15. A non-transitory computer-readable storage medium having a program embodied thereon, the program executable by a processor to perform a method for controlling adaptivity of noise cancellation, the method comprising:

adapting a coefficient to suppress a noise component of a primary audio signal and form a modified audio signal, the primary audio signal representing a first captured sound and comprising a speech component and the noise component; and outputting the modified audio signal via an output device, wherein adapting the coefficient includes reducing a value of the coefficient based on an audio noise energy estimate, the coefficient fading to zero when the audio noise energy estimate is less than a threshold, the threshold being determined based on an estimate of the microphone self-noise in the primary or a secondary audio signal, the secondary audio signal representing a second captured sound.

16. The non-transitory computer-readable storage medium of claim 14, wherein the coefficient is faded to about zero based on the noise energy estimate.

17. The non-transitory computer-readable storage medium of claim 15, wherein the noise energy estimate may be determined from the primary audio signal, the secondary audio signal or a residual audio signal derived from a difference of the primary audio signal and the speech component of the primary audio signal.

18. The non-transitory computer-readable storage medium of claim 17, wherein the noise energy estimate is performed on individual frequency sub-bands of the residual audio signal.

* * * * *

UNITED STATES PATENT AND TRADEMARK OFFICE

CERTIFICATE OF CORRECTION

PATENT NO. : 8,949,120 B1
APPLICATION NO. : 12/422917
DATED : February 3, 2015
INVENTOR(S) : Mark Every et al.

It is certified that error appears in the above-identified patent and that said Letters Patent is hereby corrected as shown below:

On the Title Page, Item (54) and in the Specification at Column 1, Line 1, after “NOISE” delete the text “CANCELATION” and insert the text --CANCELLATION--.

Signed and Sealed this
Fifth Day of May, 2015

Michelle K. Lee
*Director of the United States Patent and Trademark Office*